United States Patent
Baker et al.

(10) Patent No.: US 10,059,810 B2
(45) Date of Patent: Aug. 28, 2018

(54) ORGANICALLY MODIFIED MULTICOMPONENT CHALCOGENIDE POLYMERS

(71) Applicant: The United States of America, as represented by the Secretary of the Navy, Washington, DC (US)

(72) Inventors: Colin C. Baker, Alexandria, VA (US); Darryl A. Boyd, Alexandria, VA (US); Jason D. Myers, Alexandria, VA (US); Vinh Q. Nguyen, Fairfax, VA (US); Gryphon A. Drake, Potomac, MD (US); Woohong Kim, Lorton, VA (US); Steven R. Bowman, Edgewater, MD (US); Jasbinder S. Sanghera, Ashburn, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/359,646

(22) Filed: Nov. 23, 2016

(65) Prior Publication Data
US 2017/0145167 A1    May 25, 2017

Related U.S. Application Data

(60) Provisional application No. 62/258,664, filed on Nov. 23, 2015.

(51) Int. Cl.
*C08G 75/00* (2006.01)
*C08G 83/00* (2006.01)

(52) U.S. Cl.
CPC .................. *C08G 83/001* (2013.01)

(58) Field of Classification Search
CPC ...... C08G 75/08; C08G 83/001; G02B 1/041; C08L 75/04; G02G 1/04
See application file for complete search history.

(56) References Cited

U.S. PATENT DOCUMENTS

| | | | |
|---|---|---|---|
| 9,306,218 B2 | 4/2016 | Pyun et al. | |
| 2012/0295396 A1* | 11/2012 | Teeter | C23C 14/0629 438/95 |

OTHER PUBLICATIONS

Namnabat et al. (Proc. of SPIE vol. 9070 90702H-1, 2014).*
Chung et al., Nature Chemistry vol. 5, 518-524, (2013).*
Liu et al, "High refractive index polymers: fundamental research and practical applications," J. Mater. Chem., 19, 8907-19 (2009).

(Continued)

*Primary Examiner* — Shane Fang
(74) *Attorney, Agent, or Firm* — US Naval Research Laboratory; Rebecca L. Forman

(57) ABSTRACT

The present invention provides a method for synthesizing a new class of inorganic-organic polymeric materials. These polymers are made with a backbone comprising chalcogenide elements such as sulfur, selenium, and/or tellurium along with organic crosslinking moieties that determine its physical and optical properties. Also disclosed are the related polymeric materials. These polymers are suitable for optical applications in short wave infrared (SWIR, 1-3 μm) and mid wave infrared (MWIR, 3-8 μm) regions.

19 Claims, 6 Drawing Sheets

(56) References Cited

OTHER PUBLICATIONS

Berbenni et al., "A DSC characterization of sulphur-selenium interaction phenomenology," Thermochimica Acta, 237, 253-260 (1994).
Griebel et al., "New Infrared Transmitting Material via Inverse Vulcanization of Elemental Sulfur to Prepare High Refractive Index Polymers," Adv. Mater. 26, 3014-18 (2014).
Namnabat et al., "Optical properties of sulfur copolymers for infrared applications," Proc. of SPIE, vol. 8983 89830D-1 (2014).

* cited by examiner

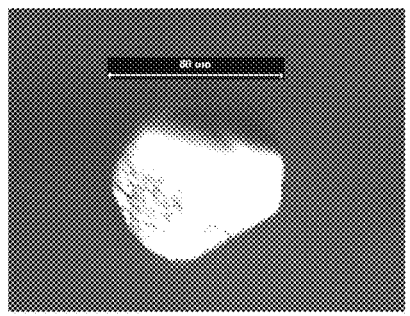
FIG. 7B
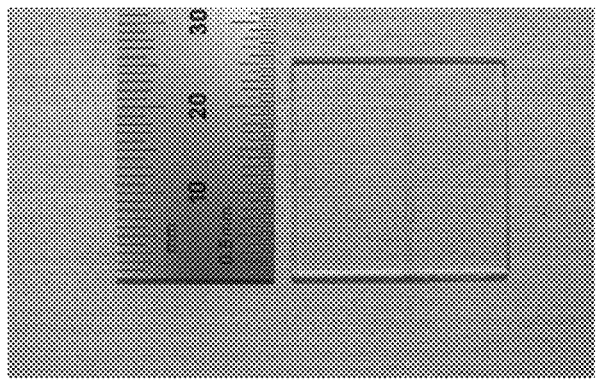 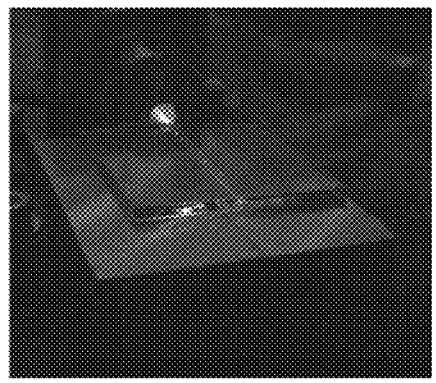
FIG. 8A                    FIG. 8B

ORGANICALLY MODIFIED MULTICOMPONENT CHALCOGENIDE POLYMERS

PRIORITY CLAIM

The present application is a non-provisional application claiming the benefit of U.S. Provisional Application No. 62/258,664, filed on Nov. 23, 2015 by Colin C. Baker et al., entitled "ORGANICALLY MODIFIED MULTICOMPONENT CHALCOGENIDE POLYMERS," the entire contents of which is incorporated herein by reference.

BACKGROUND OF THE INVENTION

Field of the Invention

The present invention relates to polymeric materials comprising chalcogenide elements with organic crosslinking moieties.

Description of the Prior Art

Infrared (IR) optical technology has numerous potential applications in civil, medical, and military areas, where inorganic semiconductors (e.g., Ge and Si) and chalcogenide glasses based on sulfur, selenium, and tellurium, have been widely used as materials for device components due to their high refractive index (n~2.0-4.0) and low optical losses from 1-10 µm. While such materials are well suited for these applications, they are inherently more expensive and difficult to process due to the high processing temperatures and volatile nature of the compounds in comparison to organic polymeric materials. Polymers are desirable due to their light weight, low cost and are often easily processed into optical components, where they are finding many applications for use in the visible region. However, the development of polymeric materials for short wave infrared (SWIR) and mid wave infrared (MWIR) optical applications has not been achieved due to challenges in designing systems with sufficiently high refractive index (n) and transparency in the infrared spectral region.

Organic polymers have refractive indices that are low, where values generally range between 1.3-1.7. (Brandrup et al., Polymer Handbook, 4th ed., John Wiley & Sons, New York, (2005)). Furthermore, because polymers are carbon and hydrogen based, they cannot be used for MWIR (3-5 µm) optical applications due to carbon-hydrogen bond absorptions in this region, for example the C—H stretch is found at 3000 $cm^{-1}$ (3.33 µm). Therefore, this region cannot be used for devices where light transmission is required. Replacement of aliphatic C—H bonds with elements that impart changes to the reduced mass, such as C-D, C—Cl, and C—F units, substantially lowers the energy of fundamental bond vibration and the absorption bands are moved significantly further into IR region. However, simply fluorinating a polymer, while eliminating C—H absorption, will significantly lower its refractive index.

Refractive index and dispersion dictate the shape and size of lenses, and higher values are needed for better focusing power and wave-guiding of light. The most common way to increase the refractive index of an organic polymer is by the incorporation of highly polarizable species into either the backbone or as pendant groups. (Liub et al., "High refractive index polymers: fundamental research and practical applications," J. Mater. Chem., 19, 8907-8919 (2009)). Sulfur, with a polarizability of 2.9 $Å^3$ as compared to 1.8 $Å^3$ for carbon, is the most common species used for increasing the refractive index. Selenium has a greater polarizability with a value of 3.8 $Å^3$, and tellurium has an even greater polarizability than selenium with a value of 5.5 $Å^3$. Therefore, chemically stable and easily processable polymers that are predominantly composed of a higher polarizability element such as sulfur, selenium and tellurium will provide an excellent opportunity to greatly increase and control the refractive index.

The chalcogenides sulfur and selenium exist predominantly as eight membered rings at room temperature. Upon heating past their melting points, chalcogenides will undergo a ring opening polymerization. These polymers are metastable however and will convert back to crystalline species upon cooling. Sulfur and selenium have been shown to interact and have complete liquid miscibility, forming a copolymer. (Berbenni et al., "A DSC characterization of sulphur-selenium interaction phenomenology," Thermochimica Acta, 237, 253-260 (1994)). For both species the opened rings form chains terminated by radicals. These radicals then combine to form longer chains. The polymer can be stabilized by the addition of divinyllic crosslinking moieties to the heated melt. This method has been applied in the case of sulfur alone. (Pyun et al., High Sulfur Content Copolymers and Composite Materials and Electrochemical Cells and Optical Elements Using Them, (WO2013023216); Griebel et al., "New Infrared Transmitting Material via Inverse Vulcanization of Elemental Sulfur to Prepare High Refractive Index Polymers," Adv. Mater., 26, 3014-3018 (2014); Chung et al., "The use of elemental sulfur as an alternative feedstock for polymeric materials," Nature Chemistry Vol 5, 518 (2013); and Namnabat et al., "Sulfur copolymers for infrared optical imaging," Proc. of SPIE Vol. 9070 90702H-1 (2014)). However, this technique alone is not able to incorporate Se into the backbone due to the different processing characteristics of pure Se and S.

BRIEF SUMMARY OF THE INVENTION

The aforementioned problems are overcome in the present invention which provides a process to obtain a polymer that has low absorption losses in the infrared region of the electromagnetic spectrum, and has a refractive index higher than conventional polymers that are currently available. This synthesis method makes the polymer suitable for low cost, easily processed lenses, waveguides, and fiber optics. A crystalline Se—S blend is made that atomically incorporates Se into an S matrix, enabling further processing via melting and crosslinking to form high refractive index chalcogenide-based polymer. These polymers comprise a backbone of sulfur and selenium that are crosslinked with functional groups such as divinyllic moieties that have a capability of crosslinking. The result is a stable polymer. The synthesis of this polymer is carried out in a two-step process. In the first step a sulfur/selenium crystalline compound is synthesized. In the second step an organic crosslinker is added to the sulfur/selenium compound to form a stable chalcogenide based polymer. The polymers made via this method (or similar methods) can also include crosslinked polymers that contain any combination of sulfur, selenium, and tellurium in any proportion, excluding 100% sulfur. Also described herein are several examples of this new polymer.

This new hybrid polymer is ideally suitable for optical applications in short wave infrared (SWIR, 1-3 µm) and mid wave infrared (MWIR, 3-8 µm) regions where conventional carbon based polymers fail due to excessive absorption losses. This new material's properties can be controlled by exploiting both the inorganic and organic components.

One advantage of the present invention is that it allows the incorporation of Se into chalcogenide-backbone polymer, increasing refractive index and through creation of the precursor S/Se mixture. The present invention also allows for precise control of the S/Se ratio in the end polymer. Additionally, the polymer mixture can be cast or formed into a variety of optical lenses that are thinner than other polymeric alternatives, due to the greater refractive index obtained by incorporating Se into the backbone. Moreover, the higher refractive index obtained relative to pure S backbone polymers enables SWIR-MWIR low-loss optical fibers, with a Se-containing core and a pure S cladding layer.

These and other features and advantages of the invention, as well as the invention itself, will become better understood by reference to the following detailed description, appended claims, and accompanying drawings.

BRIEF DESCRIPTION OF THE DRAWINGS

FIG. 7B shows light transmission through the fiber shown in FIG. 7A.

FIG. 8A shows an $S_{91}Se_9$ ridge waveguide fabricated on a soda-lime glass substrate. FIG. 8B shows the waveguide under illumination with a 632 nm laser coupled via an objective lens, demonstrating the ability of the waveguide to confine light.

DETAILED DESCRIPTION OF THE INVENTION

Figure 1:
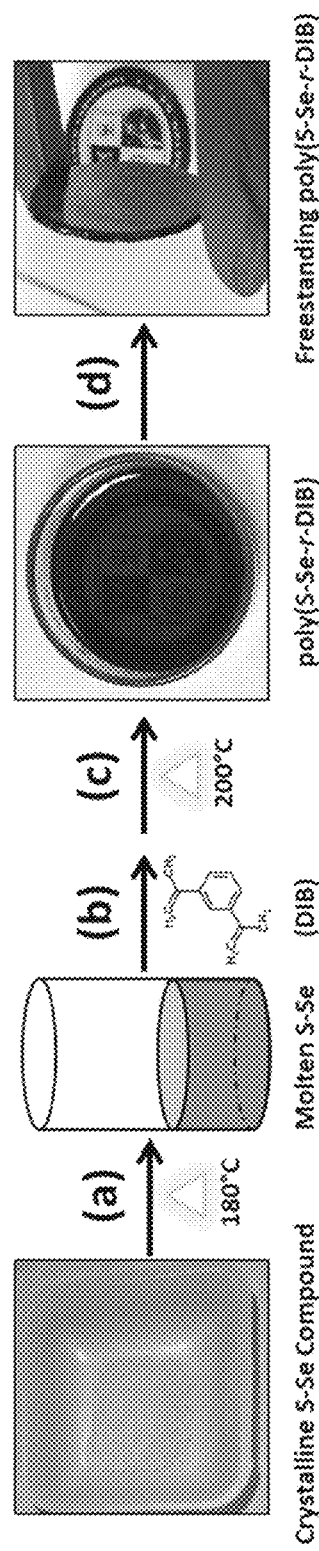
FIG. 1 is a flow diagram of poly(S—Se-r-DIB) polymer fabrication.

The present invention provides a method for synthesizing inorganic-organic polymeric materials. These polymers have a backbone comprising single component or multicomponent chalcogenide elements. Additionally, the polymers have organic crosslinking moieties that determine its physical and optical properties.

The first part of this method is to synthesize a mixed chalcogenide compound precursor. Purified powders of sulfur, selenium, and/or tellurium are loaded into an ampoule under an inert atmosphere. The ampoule containing the mixture is placed in a rocking furnace and heated to beyond the chalcogenide melting points to facilitate mixing and homogenization. The fully mixed liquid chalcogenide compound is quenched to room temperature. The resultant amorphous solid compound is then transitioned to a crystalline solid by annealing. The final precursor mixture has chalcogenide elements processed at uniform temperature, which is necessary for full incorporation in the final polymer. The final precursor mixture simplifies handling, batching, and weighing for later steps.

The next part of this method is the addition of a crosslinking moiety to the chalcogenide compound to form a polymer. Using an ampoule synthesis, the crystalline precursor and crosslinker are put into an ampoule, the ampoule is heated while rocking until chalcogenide chains open to initiate crosslinking, the ampoule is cooled to room temperature, and the polymer can be extracted. Using a beaker synthesis, the crystalline precursor is placed into a beaker and heated to about 180° C. while stirring until the chalcogenide chains have opened and the precursor is a viscous liquid, divinyllic crosslinking compound is added to the beaker to initiate crosslinking and stirred until transparent and the viscosity increases indicating a polymer has been formed, the mixture from the beaker is poured into any preferred container (e.g. petri dish) covered with Teflon and placed in a furnace set to 200° C. causing the chalcogenide compound/divinyllic crosslinker material to vitrify, and the resulting vitrified polymer is cooled to room temperature allowing the polymer to be poured into any mold and subsequently set.

In a preferred embodiment, the backbone comprises a combination of sulfur and selenium. Another embodiment has a backbone comprising a combination of sulfur, selenium, and tellurium. Instead of only S and Se, Te can be incorporated into the pre-polymer crystalline mixture to further increase the refractive index. The polymer backbone may contain any combination of sulfur, selenium, and tellurium in any proportion.

In a further preferred embodiment, the polymer organic includes divinyllic crosslinking moieties, such as diisopropenylbenzene. As an alternative, other moieties can be used as the crosslinking agent, including but not limited to: halogenated divinyllic species; dialkylvinyl species; dithiol species; polyvinyllic species; polyalkylvinyl species and metals or inorganics comprising divinyl, dithiol, dialkynyl, polyvinyl, polythiol, or polyalkynyl species (e.g., divinyl ferrocene), including mixtures of these species. Crosslinking may be achieved using a thermal method.

Sulfur/Selenium Compound Synthesis

Purified powders of sulfur and selenium are loaded in a silica ampoule placed under an inert nitrogen gas atmosphere. The sulfur and selenium may be used in ratios of sulfur 60~99 at. % and selenium 40~1 at. %. The ampoule containing the precursors is connected to a vacuum pump and evacuated. The ampoule is then sealed using a methane/oxygen torch and placed inside a rocking furnace. The furnace is heated to 400° C. and is rocked to facilitate mixing and homogenization of the S and Se and components. The rocking furnace is then stopped and the temperature of the furnace is cooled to 320° C. and held for 1 hour. The hot ampoule is removed from the furnace, submerged in a room temperature water bath for 5 minutes to quench the compound. The resultant sulfur/selenium compound is an amorphous solid which is then transitioned to a crystalline solid by then placing it inside another furnace at 75° C. for an extended period. This transition from the amorphous S—Se phase to a crystalline phase is needed to aid in handling, weighing, and batching of the material. Finally the sulfur/selenium compound is removed from the ampoule.

Addition of Polyvinyllic Crosslinking Moiety to Sulfur/Selenium Compound to Form a Polymer The sulfur/selenium crystalline compound may be polymerized in a subsequent ampoule or in a beaker. For ampoule synthesis, the constituents are added in ratios of sulfur/selenium from 50~90 wt. % and a divinyllic crosslinking compound 10~50 wt. % into the ampoule. The ampoule is then evacuated and is submerged in liquid nitrogen to ensure freezing of the liquid divinyllic precursor. The ampoule is then quickly sealed using a methane/oxygen torch.

The ampoule containing the sulfur/selenium compound and divinyllic precursor is placed inside a rocking furnace. The furnace is heated slowly to ~170° C. and held for 1 hour while the furnace is rocked to facilitate mixing and homogenization of the mixture. Next, the furnace motion is stopped and the temperature of the furnace is reduced slowly to room temperature.

In the case where polymer synthesis is carried out in a beaker, the sulfur/selenium crystalline compound is loaded into a beaker containing a magnetic stir bar. The beaker is placed in an oil bath that has been pre-heated to ~180° C. The higher temperature is required in the beaker synthesis method because rapid cooling occurs on the surface of the polymer exposed to the ambient. The compound is then stirred until it is completely melted and the now molten compound becomes viscous. A divinyllic crosslinking compound is then added to the beaker and the contents of the beaker are stirred until the mixture becomes transparent and the viscosity increases. The magnetic stir bar is removed and the mixture is then poured from the beaker into any preferred container (e.g. petri dish), covered with Teflon, and placed in a furnace that is set to 200° C., causing the sulfur/selenium/divinyllic crosslinker material to vitrify. The resulting vitrified polymer is allowed to cool to room temperature. This method allows the polymer to be poured into any mold and subsequently set. The constituents may be added in ratios of sulfur/selenium from 50~90 wt. % and a divinyllic crosslinking compound 10~50 wt. %.

Figure 9:
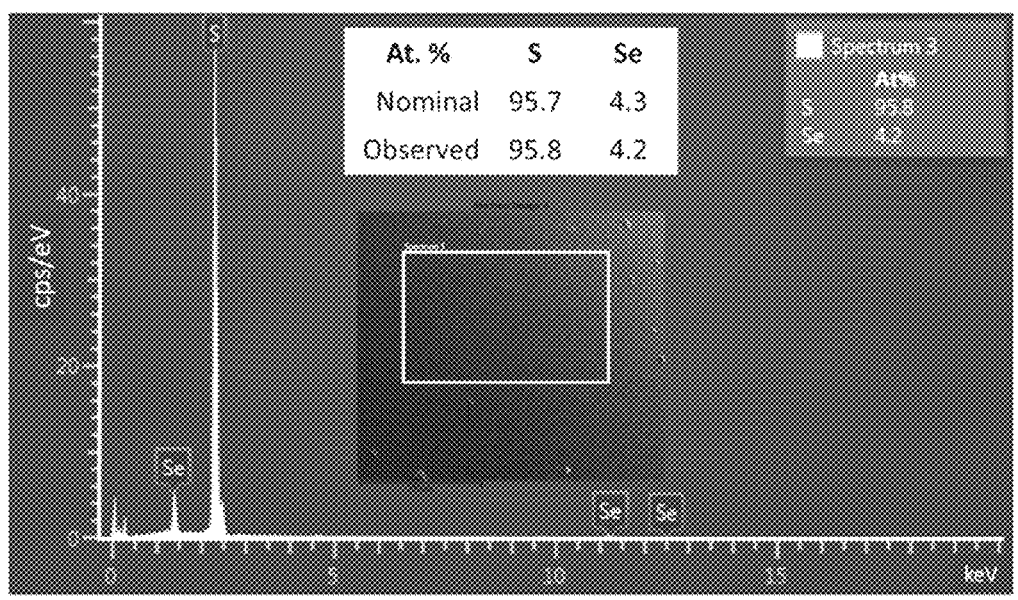
FIG. 9 shows a representative EDAX spectrum of poly($S_{96}$—$Se_4$-r-DIB) polymer formed via inverse vulcanization.

FIG. 1 shows a flow diagram of poly(S—Se-r-DIB) polymer fabrication. Step (a): melt and stir S—Se crystalline compound. Step (b): add DIB and continue stirring. Step (c): pour molten material into a mold (e.g. a petri dish), heat to 200° C. (1 hr) and then cool to vitrify. Step (d): retrieve freestanding transparent polymer from mold. Scale bar for the poly(S—Se-r-DIB) polymer shown is 1 cm. FIG. 9 shows energy dispersive X-ray spectroscopy (EDX) data indicating that sulfur and selenium are being incorporated into the final sulfur-selenium polymer at a ratio consistent with the composition of the precursor compound.

EXAMPLE 1

This example details the synthesis of an $S_{98}Se_2$ compound and then the subsequent addition of 1,3-diisopropenylbenzene (DIB) to form a stable sulfur/selenium polymer, using the ampoule synthesis method. The subscripts represent the atomic percentage of sulfur and selenium in the precursor compound. Four times distilled sulfur (95 grams) and selenium (5 grams) precursors were used to constitute a compound $S_{98}Se_2$ at % composition. The precursors were loaded in a 1 inch inner diameter silica ampoule placed under an inert nitrogen gas atmosphere. The ampoule containing the precursors was connected to a vacuum pump and evacuated for 3 hours at $1 \times 10^{-5}$ Torr. The ampoule was then sealed using a methane/oxygen torch and placed inside a rocking furnace. The furnace was slowly heated from 20° C. (room temperature) to 400° C. and held constant at 400° C. for 2 hours to form a melt, while the furnace was rocked to facilitate mixing and homogenization of the S and Se elemental components. Next, the furnace rocking was stopped and the furnace was set to a vertical position to collect the melt at the bottom of the ampoule. The temperature of the furnace was slowly reduced to 320° C. and held for 1 hour. The hot ampoule was then removed from the furnace, submerged in a room temperature water bath for 5 minutes to quench into an amorphous solid compound.

Figure 2:
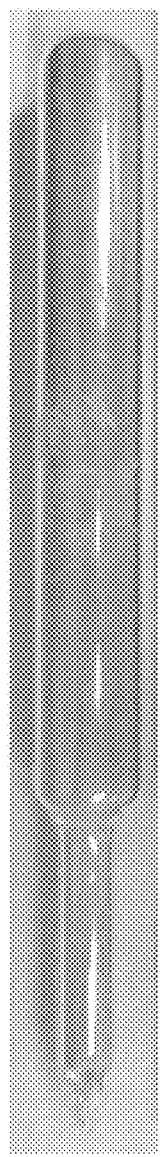
FIG. 2 shows an ampoule containing $S_{98}Se_2$ crystalline compound.

The ampoule containing the amorphous compound was placed inside another furnace and heated slowly from room temperature to 75° C. and held at 75° C. for 10 hours to transform the $S_{98}Se_2$ compound from an amorphous to a crystalline phase. As stated previously, this is done to aid in handling, weighing, and batching of the material. The ampoule was transferred inside the glove box and the crystalline $S_{98}Se_2$ compound was easily retrieved. An ampoule containing the $S_{98}Se_2$ crystalline compound is shown in FIG. 2.

Twenty grams of the $S_{98}Se_2$ compound and 8.571 grams of liquid 1,3-diisopropenylbenzene (DIB), to constitute a 70 wt % ($S_{98}Se_2$)—30 DIB wt % composition mixture were loaded into a 1 inch diameter silica ampoule. A valve was attached to the ampoule which was connected to a vacuum pump. The ampoule was submerged in liquid nitrogen for 15 minutes to ensure freezing of the liquid DIB. Next, the valve was opened and evacuated for 30 seconds at $3 \times 10^{-3}$ Torr. In order to minimize the evaporative loss of the DIB, the ampoule was quickly sealed using a methane/oxygen torch.

Figures 3A, 3B, 3C:
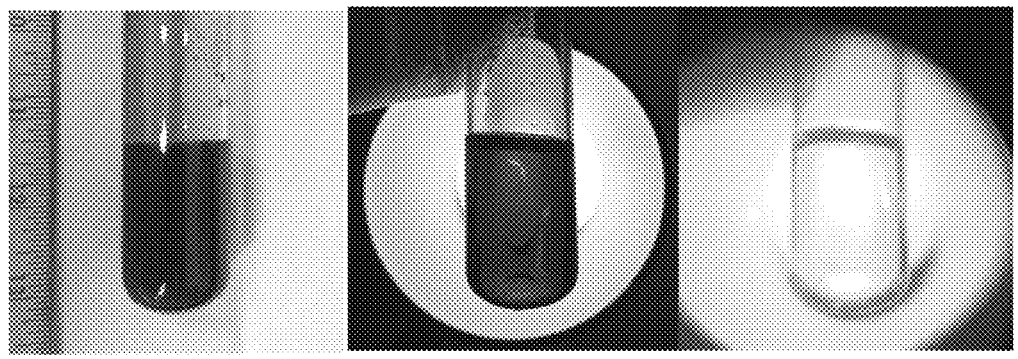
FIG. 3A shows an ampoule containing an $S_{98}Se_2$—30 wt % DIB polymer front lit with visible light.
FIG. 3B shows an ampoule containing an $S_{98}Se_2$—30wt % DIB polymer back lit with visible light.
FIG. 3C shows an ampoule containing an $S_{98}Se_2$—30wt % DIB polymer back lit in the short wave infrared region.

The ampoule containing the 70 wt % ($S_{98}Se_2$)—30 wt % DIB composition was placed inside a rocking furnace. The furnace was slowly heated from room temperature to 155° C. and held at 155° C. for 1 hour while it was rocked to facilitate the homogenization of the ($S_{98}Se_2$)—DIB mixture. The furnace containing the ampoule was then set to a vertical position and the temperature of the furnace was reduced slowly to room temperature. In FIGS. 3A-3C, an ampoule containing the $S_{98}Se_2$ polymer is given. The ampoule is viewed front lit with visible light (FIG. 3A), back lit with visible light (FIG. 3B), and back lit with short wave infrared light (FIG. 3C), illustrating the transmissive behavior of the polymer.

EXAMPLE 2

Figure 4:
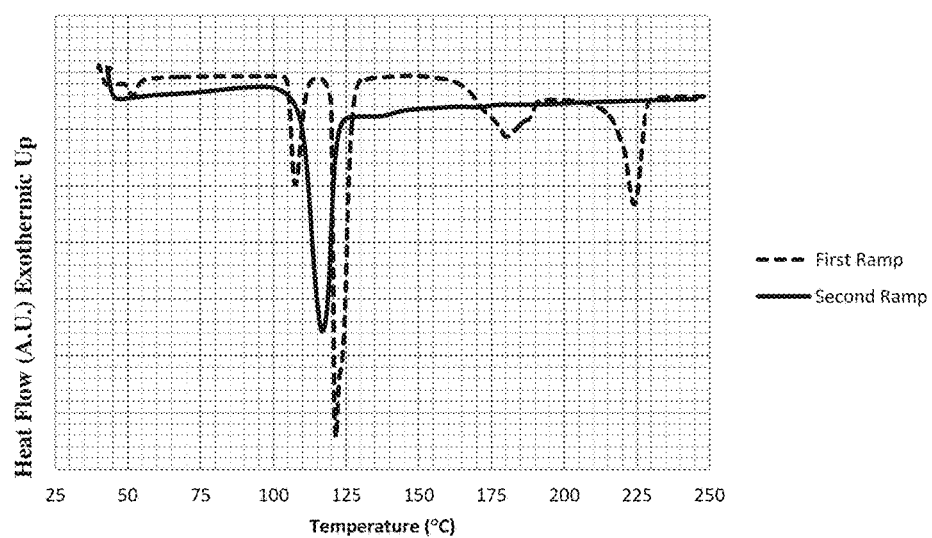
FIG. 4 is a DSC curve for the reaction of 79 wt. % S and 21 wt. % Se to form a crystalline compound.

This example illustrates the use of differential scanning calorimetry (DSC) to analyze the reaction of sulfur and selenium precursors to form an $S_{79}Se_{21}$ crystalline compound. In FIG. 4, a DSC plot is given for the formation of the $S_{79}Se_{21}$ compound with the absence of a crosslinking moiety. This sample was prepared by adding 11.6 mg of sulfur with 7.4 mg of selenium in a hermetically-sealed pan. The sample was heated to 250° C. at 10° C. per minute, cooled to 40° C. at 5° C. per minute, then heated again to 250° C. at 10° C. per minute. The heat flow vs. temperature plot shown in FIG. 4 has endotherm peaks characteristic of crystalline sulfur and selenium during the first heating ramp, indicated by the dashed line. The endotherm at 100° C. is associated with a phase transition for crystalline sulfur from the α→β phase. The transition of crystalline sulfur to liquid is given by the endotherm near 120° C. Beyond the liquid transformation the sulfur rings have opened, and they begin to form a polymer, observed by the endotherm at 180° C. At 224° C. the selenium melting endotherm is evident signifying the transition to a liquid. These features are the specific markers for crystalline sulfur and selenium. Upon cooling, the sample reverts back to its rhombic crystalline phase, and during the second heating, solid curve, the features that are characteristic of crystalline sulfur and ring opening are once again shown. However, the selenium melting endotherm is absent. This indicates that the selenium is incorporated into the sulfur structure. This example indicates that a crystalline phase of the compound exists during a heating cycle and the ring opening is observed but is not stable in a sample in which a crosslinking moiety is absent.

EXAMPLE 3

Figure 5:
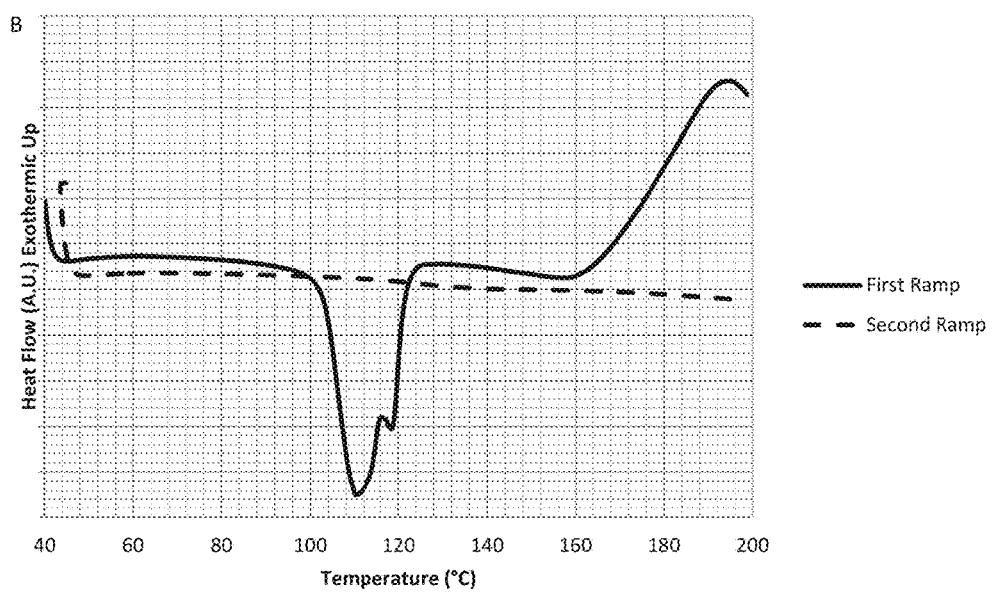
FIG. 5 is a DSC curve for $S_{98}Se_2$ compound reacted with DIB to form a polymer.

This example illustrates the use of differential scanning calorimetry (DSC) to analyze crosslinking of an $S_{98}Se_2$ compound with DIB to form a polymer. In FIG. 5, a DSC curve is given for the characteristic polymerization process when the crosslinking moiety 1,3-diisopropenylbenzene (DIB) was added to an $S_{98}Se_2$ crystalline. The $S_{98}Se_2$ compound was formed in the manner described in example 2. Here the peaks characteristic of phase transition and ring opening, as discussed, were observed on the first heating stage, solid curve. The DIB then reacts at high temperature with the $S_{98}Se_2$ compound. The rings are open and stabilized upon cooling down. The second heating curve, dashed line, is now indicative of the $S_{98}Se_2$ stable polymer and therefore no phase transition and ring opening is observed as indicated by the absence of peaks. This example illustrates the stable polymerization of the $S_{98}Se_2$ compound which is formed by the addition of DIB.

EXAMPLE 4

Figure 6:
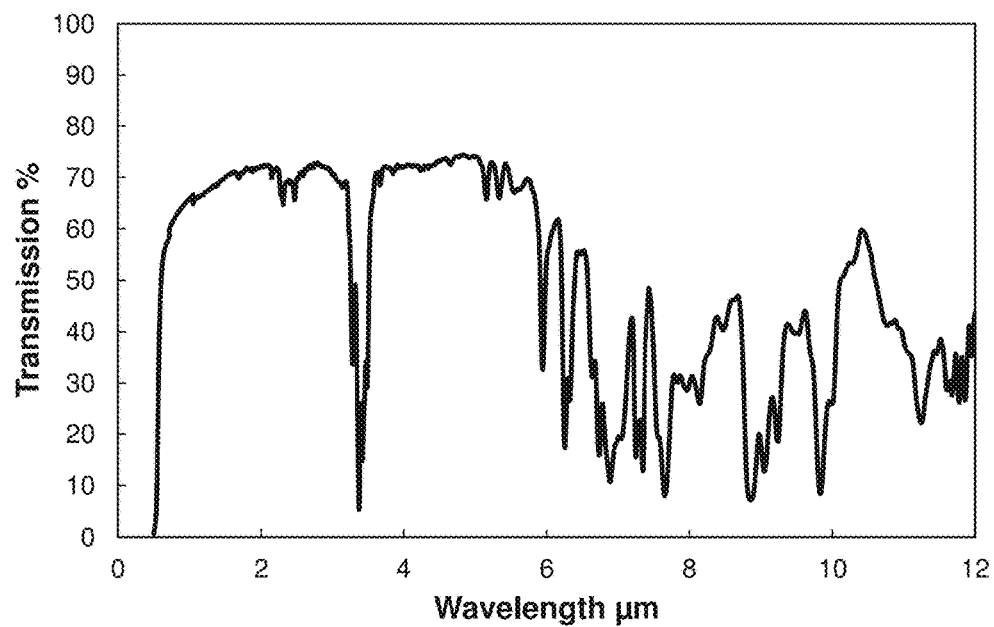
FIG. 6 shows an infrared transmission curve for $S_{98}Se_2$ polymer.

This example gives the visible, short wave, and mid wave infrared transmission characteristics of a sulfur/selenium polymer. In FIG. 6, the optical transmission plot of an $S_{98}Se_2$ polymer is given. It is evident that the polymer has transmission windows in the range from 500 nm to 3.25 μm and then from 3.5 μm to nearly 6 μm. The latter transmission window represents an advancement of the mid infrared transmission characteristics for polymers. The absorption band in the 3.25 μm region is due to the C—H stretch associated with the DIB crosslinker and could be removed using crosslinkers without C—H bonds.

EXAMPLE 5

This example illustrates the increase in refractive index by the incorporation of selenium into the sulfur polymer. In table 1, values for refractive index at three wavelengths in the near infrared and short wave infrared for a pure sulfur polymer and a polymer composed of $S_{90}Se_{10}$ polymer are given. It is evident that the addition of the selenium to the polymer has increased the refractive index. This example illustrates that the addition of the higher polarizable species selenium does indeed serve to increase the refractive index of the polymer.

TABLE 1

Refractive index values for polymer composed of 100% sulfur compared with polymer with 10% selenium incorporated.

| Wavelength (nm) | Sulfur 100at. % | Sulfur 90at %-Selenium 10 at. % |
|---|---|---|
| 635 | 1.8244 | 1.9056 |
| 982.8 | 1.7898 | 1.8536 |
| 1549.6 | 1.7668 | 1.8348 |

EXAMPLE 6

Figure 7A:
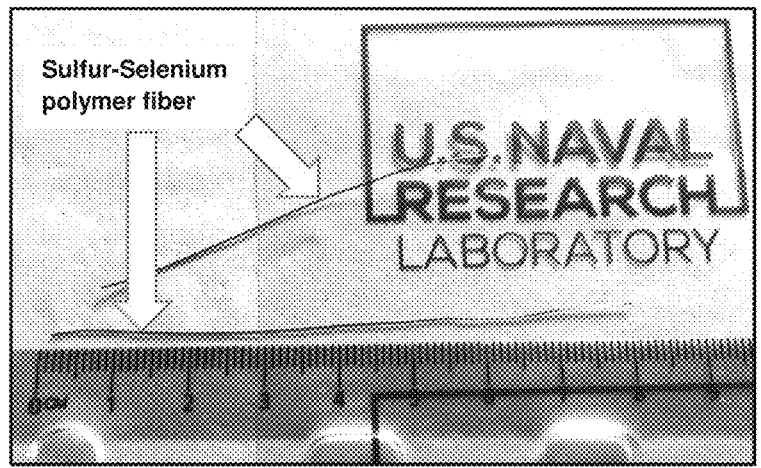
FIG. 7A shows a flexible fiber drawn from $S_{91}Se_9$ polymer.

This example illustrates the use of a fabricated $S_{91}Se_9$ polymer fiber as on optical waveguide. The $S_{80}Se_{20}$ compound was first heated to form a viscous liquid, and a fiber was slowly drawn from the polymer solution using a spatula. A uniform fiber with a diameter as small as 80 μm was continuously drawn. The fiber was very flexible and is shown in FIG. 7A. FIG. 7B shows the end face of the fiber transmitting light through the fiber. It is quite clear that core/clad optical fibers can be made by using a higher index polymer for the core and a lower index polymer for the cladding.

EXAMPLE 7

This example details the molding of the $S_{98}Se_2$ polymer into specific shapes, such as an optical lens (FIG. 1C). During processing, the viscous uncured polymer is poured into a mold with the desired shape. The mold itself may be made of a high surface energy non-stick material that is capable of withstanding temperatures in excess of 200° C. The polymer is then cured within the mold in a furnace at 200° C. Following the curing process, the shaped polymer is removed from the mold. Removal may require freezing the mold and the polymer at temperatures below 0° C., and then removing the polymer. This method represents a simple and effective method for lens manufacture.

EXAMPLE 8

This example illustrates a ridge waveguide fabricated from an $S_{91}Se_9$ polymer. $S_{91}Se_9$ polymer was dissolved in hot trichlorobenzene. A solvent-cleaned piece of 1"×1" soda-lime glass was used as the substrate. The substrate surface was covered in polyimide tape with a ~200 μm strip of bare glass left exposed in the center of the substrate. Hot $S_{91}Se_9$ solution was drop-cast into the channel. Excess solution was wicked away with a disposable tissue and the substrate was placed on a warm (~80° C.) hot plate to assist in driving off the solvent. After drying for ~15 minutes, the tape was removed, leaving behind a ridge waveguide composed of $S_{91}Se_9$ polymer (FIGS. 8A and 8B). The waveguide was allowed to fully dry overnight. The waveguide was then illuminated with a 632 nm 3 mW laser through an objective lens. FIG. 8B shows the waveguide under illumination, demonstrating its capability to guide light.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," is not to be construed as limiting the element to the singular.

What is claimed as new and desired to be protected by Letters Patent of the United States is:

1. A method to make an organically modified multicomponent chalcogenide polymer, comprising:
    combining two or more chalcogenide elements and heating said two or more chalcogenide elements to 400° C. to form an amorphous compound;
    annealing the amorphous compound at 75° C. to form a crystalline precursor; and
    adding a crosslinking moiety to the crystalline precursor to form the organically modified multicomponent chalcogenide polymer.
2. The method of claim 1, wherein the chalcogenide elements comprise any combination of sulfur, selenium, and tellurium.

3. The method of claim 1, wherein the chalcogenide elements comprise 60-99 atomic percent sulfur and 1-40 atomic percent selenium.

4. The method of claim 1, wherein the crosslinking moiety is polyvinyllic.

5. The method of claim 1, wherein the crosslinking moiety is diisopropenylbenzene.

6. The method of claim 1, wherein the crosslinking moiety is a halogenated divinyllic species, a dialkylvinyl species, a dithiol species, a polyvinyllic species, a polyalkynyl species or a metal or an inorganic compound comprising a divinyl, dithiol, dialkynyl, polyvinyl, polythiol, or polyalkynyl species.

7. The method of claim 1, wherein when adding the crosslinking moiety to the crystalline precursor, the crosslinking moiety comprises 10-50 weight percent and the crystalline precursor comprises 50-90 weight percent.

8. An organically modified multicomponent chalcogenide polymer made by the method, comprising:
   combining two or more chalcogenide elements to form an amorphous compound;
   annealing the amorphous compound to form a crystalline precursor; and
   adding a crosslinking moiety to the crystalline precursor to form the organically modified multicomponent chalcogenide polymer.

9. The polymer of claim 8, wherein the chalcogenide elements comprise any combination of sulfur, selenium, and tellurium.

10. The polymer of claim 8, wherein the chalcogenide elements comprise 60-99 atomic percent sulfur and 1-40 atomic percent selenium.

11. The polymer of claim 8, wherein the crosslinking moiety is polyvinyllic.

12. The polymer of claim 8, wherein the crosslinking moiety is diisopropenylbenzene.

13. The polymer of claim 8, wherein the crosslinking moiety is a halogenated divinyllic species, a dialkylvinyl species, a dithiol species, a polyvinyllic species, a polyalkynyl species or a metal or an inorganic compound comprising a divinyl, dithiol, dialkynyl, polyvinyl, polythiol, or polyalkynyl species.

14. The polymer of claim 8, wherein when adding the crosslinking moiety to the crystalline precursor, the crosslinking moiety comprises 10-50 weight percent and the crystalline precursor comprises 50-90 weight percent.

15. A method to make an organically modified chalcogenide polymer, comprising:
   annealing a tellurium powder to form a crystalline precursor; and
   adding a crosslinking moiety to the crystalline precursor to form the organically modified chalcogenide polymer, wherein the tellurium powder comprises 50-90 weight percent.

16. The method of claim 15, wherein the crosslinking moiety is polyvinyllic.

17. The method of claim 15, wherein the crosslinking moiety is diisopropenylbenzene.

18. The method of claim 15, wherein the crosslinking moiety is a halogenated divinyllic species, a dialkylvinyl species, a dithiol species, a polyvinyllic species, a polyalkynyl species or a metal or an inorganic compound comprising a divinyl, dithiol, dialkynyl, polyvinyl, polythiol, or polyalkynyl species.

19. The method of claim 15, wherein when adding the crosslinking moiety to the crystalline precursor, the crosslinking moiety comprises 10-50 weight percent and the crystalline precursor comprises 50-90 weight percent.

* * * * *